US010360560B2

(12) United States Patent
Bryant

(10) Patent No.: US 10,360,560 B2
(45) Date of Patent: Jul. 23, 2019

(54) SYSTEM FOR AUTHENTICATING A WEARABLE DEVICE FOR TRANSACTION QUEUING

(71) Applicant: BANK OF AMERICA CORPORATION, Charlotte, NC (US)

(72) Inventor: Matthew K. Bryant, Gastonia, NC (US)

(73) Assignee: Bank of America Corporation, Charlotte, NC (US)

(*) Notice: Subject to any disclaimer, the term of this patent is extended or adjusted under 35 U.S.C. 154(b) by 314 days.

(21) Appl. No.: 14/842,787

(22) Filed: Sep. 1, 2015

(65) Prior Publication Data

US 2017/0061405 A1    Mar. 2, 2017

(51) Int. Cl.
G06Q 20/40         (2012.01)
G06Q 20/32         (2012.01)

(52) U.S. Cl.
CPC ..... *G06Q 20/4014* (2013.01); *G06Q 20/3224* (2013.01); *G06Q 20/3278* (2013.01)

(58) Field of Classification Search
None
See application file for complete search history.

(56) References Cited

U.S. PATENT DOCUMENTS

| 7,295,832 B2 | 11/2007 | Hewel |
| 8,196,066 B1 | 6/2012 | Ouyang et al. |
| 8,810,430 B2 | 8/2014 | Proud |
| D717,956 S | 11/2014 | Alexander et al. |
| 9,002,272 B2 | 4/2015 | Friedlaender |
| 9,016,565 B2 | 4/2015 | Zhou et al. |
| 9,044,150 B2 | 6/2015 | Brumback et al. |
| 9,274,599 B1 | 3/2016 | D'Amico et al. |
| 9,398,007 B1 | 7/2016 | Wegener et al. |
| 9,554,274 B1 | 1/2017 | Castinado et al. |
| 9,641,526 B1 | 5/2017 | Gopalakrishnan et al. |

(Continued)

FOREIGN PATENT DOCUMENTS

| KR | 20130047476 | 5/2013 |
| WO | WO 2014104436 | 3/2014 |

*Primary Examiner* — Bennett M Sigmond
*Assistant Examiner* — Dario Bianco
(74) *Attorney, Agent, or Firm* — Michael A. Springs; Moore & Van Allen PLLC; Nicholas C. Russell

(57) ABSTRACT

Embodiments of the invention are directed to systems, methods, and computer program products for authenticating a wearable device for transaction queuing. The system enables a user to pre-authenticate the wearable device and utilize the pre-authenticated wearable device to execute one or more transactions, from a pending transaction queue, without requiring additional authentication credentials for each transaction. In this regard, the system is configured to receive limits associated with the use of the wearable device and enable the user to initiate a transaction associated with a transaction terminal. Furthermore the system may suggest one or more suitable locations of transaction terminals. The system may then place the transaction in a pending transaction queue and transmit a notification to the user indicating that the transaction has been processed. In response, the system may receive a token from the pre-authenticated wearable device at the transaction terminal and enable the user to complete transaction.

20 Claims, 4 Drawing Sheets

(56) References Cited

U.S. PATENT DOCUMENTS

| | | | |
|---|---|---|---|
| 9,942,222 B1* | 4/2018 | Fenton | H04L 63/0853 |
| 9,953,312 B2 | 4/2018 | Lee | |
| 10,223,937 B2 | 3/2019 | Pacchione | |
| 2003/0028481 A1 | 2/2003 | Flitcroft et al. | |
| 2004/0225613 A1 | 11/2004 | Narayanaswami | |
| 2007/0183599 A1 | 8/2007 | Cohen et al. | |
| 2007/0189194 A1 | 8/2007 | Hrastar | |
| 2007/0199053 A1 | 8/2007 | Sandhu et al. | |
| 2009/0146947 A1 | 6/2009 | Ng | |
| 2009/0249342 A1* | 10/2009 | Johnson | G06Q 10/04 718/101 |
| 2012/0030043 A1 | 2/2012 | Ross et al. | |
| 2013/0159195 A1 | 6/2013 | Kirillin et al. | |
| 2013/0332509 A1 | 12/2013 | Schwartz et al. | |
| 2014/0012701 A1 | 1/2014 | Wall et al. | |
| 2014/0135631 A1 | 5/2014 | Brumback et al. | |
| 2014/0230019 A1 | 8/2014 | Civelli et al. | |
| 2014/0279528 A1 | 9/2014 | Slaby | |
| 2014/0280450 A1 | 9/2014 | Luna | |
| 2014/0282877 A1 | 9/2014 | Mahaffey et al. | |
| 2014/0351070 A1 | 11/2014 | Christner et al. | |
| 2014/0380445 A1 | 12/2014 | Tunnell et al. | |
| 2015/0040203 A1 | 2/2015 | Qian | |
| 2015/0088757 A1 | 3/2015 | Zhou et al. | |
| 2015/0127541 A1 | 5/2015 | Just et al. | |
| 2015/0145656 A1 | 5/2015 | Levesque et al. | |
| 2015/0147961 A1 | 5/2015 | Britt, Jr. et al. | |
| 2015/0235205 A1* | 8/2015 | Sebestyen | G06Q 30/0601 705/26.41 |
| 2015/0242837 A1 | 8/2015 | Yarbrough et al. | |
| 2015/0262458 A1 | 9/2015 | Faaborg et al. | |
| 2015/0294303 A1 | 10/2015 | Hanson et al. | |
| 2015/0294306 A1 | 10/2015 | Grigg et al. | |
| 2015/0348006 A1 | 12/2015 | Taveau et al. | |
| 2016/0050204 A1 | 2/2016 | Anderson | |
| 2016/0071094 A1 | 3/2016 | Krishnaiah et al. | |
| 2016/0086155 A1* | 3/2016 | Candelore | G06Q 20/3224 705/21 |
| 2016/0125677 A1 | 5/2016 | Williams et al. | |
| 2016/0135046 A1* | 5/2016 | John Archibald | H04W 12/06 455/411 |
| 2016/0232516 A1 | 8/2016 | Dayan et al. | |
| 2016/0261409 A1 | 9/2016 | French et al. | |
| 2016/0314456 A1 | 10/2016 | Douglas et al. | |
| 2016/0321651 A1 | 11/2016 | Douglas | |
| 2016/0335626 A1 | 11/2016 | Ko et al. | |
| 2016/0378963 A1 | 12/2016 | Anderson | |
| 2016/0379205 A1 | 12/2016 | Margadoudakis | |
| 2017/0061414 A1 | 3/2017 | Castinado et al. | |
| 2017/0061422 A1 | 3/2017 | Castinado et al. | |
| 2017/0185759 A1 | 6/2017 | Schmidt et al. | |

\* cited by examiner

SYSTEM FOR AUTHENTICATING A WEARABLE DEVICE FOR TRANSACTION QUEUING

BACKGROUND

Wearable devices, smart or otherwise, are becoming more prevalent in a variety of markets and industries. The use of wearable devices comes with a need for the security of personal information, an issue that concerns many people. As a result, several business industries, such as financial institutions, have taken precautionary measures to ensure the safety of personal information while ensuring convenience. This is typically accomplished by authenticating the wearable device and preauthorizing the wearable device to execute transactions.

However, to date, transaction terminals like automated teller machines (ATMs) and point of sale terminals have remained "contact" terminals requiring swiping of a magnetic strip of a payment card or similar function for authentication of the user. The absence of contactless functionality and transaction queuing with transaction terminals in the marketplace is largely due to security issues and the differences in data that must be transmitted and processed. Furthermore, the authentication obtained by conventional means (providing user name and passcode, swiping the magnetic strip of a payment card and the like) are typically temporary and last only for a particular session at a transaction terminal and do not permit transaction queuing. With users performing a multitude of transactions using wearable devices in the financial industry, there is a need to ensure security and convenience. Although wearable devices may be used as a form of a payment vehicle at contactless point-of-sale terminals at merchant locations, the merchant may still have to confirm the identity of the user adorning the wearable device at every interaction to determine the trustworthiness of the user and reduce the likelihood of misrepresentation. In this regard the user would have to provide authentication credentials to authorize the transaction. Thus, a need presently exists for a product that permits the user to engage in transactions with transaction terminals that utilize the pre-authenticated wearable device of the user to authorize transactions.

BRIEF SUMMARY

Embodiments of the present invention address the above needs and/or achieve other advantages by providing apparatuses (e.g., a system, computer program product and/or other devices) and methods for affecting transaction queuing based on pre-authenticating a wearable device of the user. As such, the invention provides for a smart queuing based on continuously monitoring the authentication of the wearable device and enabling the user to initiate transactions present in a pending transaction queue at a transaction terminal without requiring the input of additional authentication credentials. The user may authenticate the wearable device at a first time and this authentication may be utilized to execute transactions at a transaction terminal. For example, the user may initiate a transaction, the transaction may be placed in a pending transaction queue, the user may be notified when the transaction is ready and the user may be enabled to execute/complete the transaction based on the pre-authenticated wearable device at a transaction terminal, without providing additional authorization credentials like swiping the magnetic strip of a payment card, providing user ID and passcode and the like.

The features, functions, and advantages that have been discussed may be achieved independently in various embodiments of the present invention or may be combined with yet other embodiments, further details of which can be seen with reference to the following description and drawings.

Embodiments of the invention are directed systems, computer program products and methods for authenticating a wearable device for transaction queuing, comprising: receiving an indication that a user is in possession of the wearable device, the wearable device being associated with a token, the token being associated with the user; authenticating the wearable device at a first time based on at least receiving the indication that the user is in possession of the wearable device, wherein authenticating the wearable device comprises authentication of the token; electronically receiving one or more limits associated with execution of one or more transactions using the wearable device, the one or more limits being associated with one or more transactions; receiving an indication that the user wishes to execute a first transaction at a transaction terminal, wherein receiving the indication further comprises determining a transaction type associated with the first transaction; determining that the user continues to remain in possession of the wearable device based on at least continuously monitoring the wearable device from the first time; determining a first user location, wherein determining the first user location comprises analyzing at least a user profile of the user; determining one or more locations of transaction terminals based on at least the transaction type and the first user location; transmitting the one or more locations of transaction terminals to the wearable device; receiving a selection of at least one of the one or more transaction terminals from the user through the wearable device, wherein receiving the selection comprises the user initiating the transaction; placing the first transaction in a pending transaction queue, wherein the pending transaction queue comprises other pending transactions received from the user or one or more other users; processing the first transaction, wherein processing the first transaction comprises at least partial completion of the first transaction; transmitting a notification to the wearable device indicating that the transaction has been processed; receiving the authenticated token from the wearable device at the transaction terminal and authenticate the user without requiring additional authorization credentials, wherein the transaction terminal is associated with the received selection of the at least one location; completing execution of the first transaction based on at least determining that the first transaction is within the one or more limits and that the user continues to remain in possession of the wearable device from the first time; and transmitting a confirmation indicating the completion of the first transaction to the wearable device.

Some embodiments of the invention are also directed to establishing an operative communication link between the wearable device and the transaction terminal; electronically receiving an indication that the user has scanned the wearable device at the transaction terminal; retrieving the token associated with the wearable device based on at least receiving the indication that the user has scanned the wearable device at the transaction terminal, wherein the token comprises user identification information; and completing authentication of the user using token information associated with the token.

In some embodiments, completing the transaction further comprises: determining, automatically, a second transaction from the pending transaction queue, wherein the second transaction is associated with the user; initiating presentation of an interface to the user on the transaction terminal, the interface enabling the user to initiate the second transaction; completing execution of the second transaction based on at least determining that the second transaction is within the one or more limits and that the user continues to remain in possession of the wearable device from the first time; receiving an indication that the user, through the interface, to initiate a third transaction, wherein the third transaction is not in the pending transaction queue; and completing execution of the third transaction based on at least determining that the third transaction is within the one or more limits and that the user continues to remain in possession of the wearable device from the first time;

In some embodiments, transmitting the notification to the wearable device indicating that the transaction has been processed further comprises: determining a second user location based on communication with the wearable device; determining that the second user location is within a predetermined distance from the transaction terminal; determining a start time associated with the first transaction based on at least determining the number of other users waiting at the transaction terminal and retrieving scheduled transactions at the transaction terminal; determining an end time associated with the first transaction based on at least the transaction type associated with the first transaction and historical durations of the transactions at the transaction terminal; and transmitting the notification to the user wearable device comprising at least the approximate start time, the approximate end time and a route map; wherein the route map directs the user to the transaction terminal or a waiting area.

In some embodiments, determining the second user location further comprises: analyzing the global positioning information received from the wearable device; and establishing a communication link between a transmitter associated with the transaction terminal and the wearable device; wherein the transmitter transmits an encoded signal that is received and decoded by the wearable device; wherein the wearable device transmits the second user location to the transaction terminal.

Some embodiments of the invention are further directed to continuously monitoring the wearable device to determine whether the user continues to remain in possession of the wearable device, wherein monitoring further comprises continuously receiving input from the wearable device, the input comprising biometric feedback associated with the wearable device.

Some embodiments of the invention are further directed to electronically receive one or more limits associated with execution of one or more transactions using the wearable device, wherein the one or more limits comprise at least a spending limit, a threshold on a number of transactions, a time limit, a merchant category, a product category, and/or a geographic location.

BRIEF DESCRIPTION OF THE DRAWINGS

Figure 1:
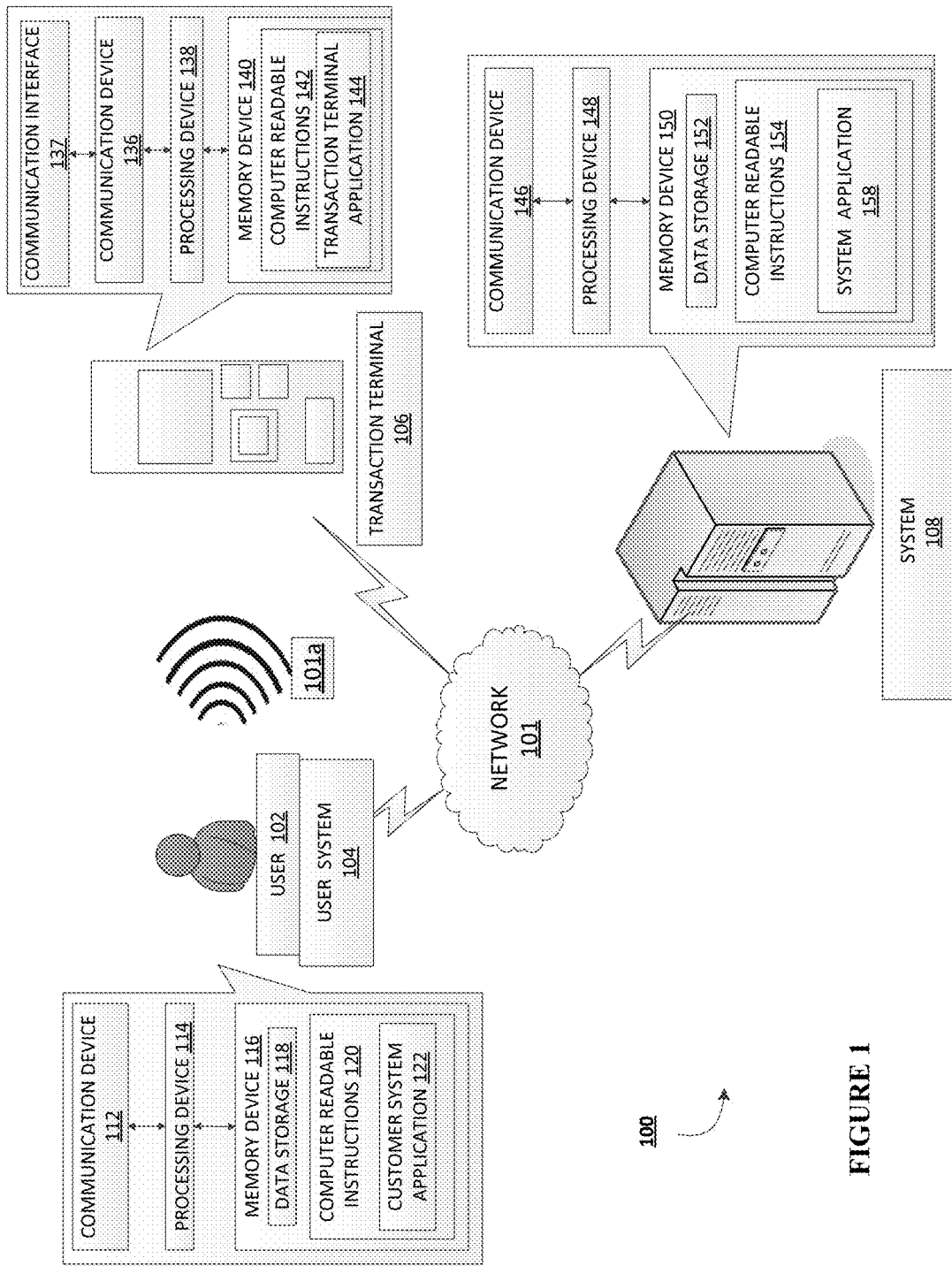
Figure 2:
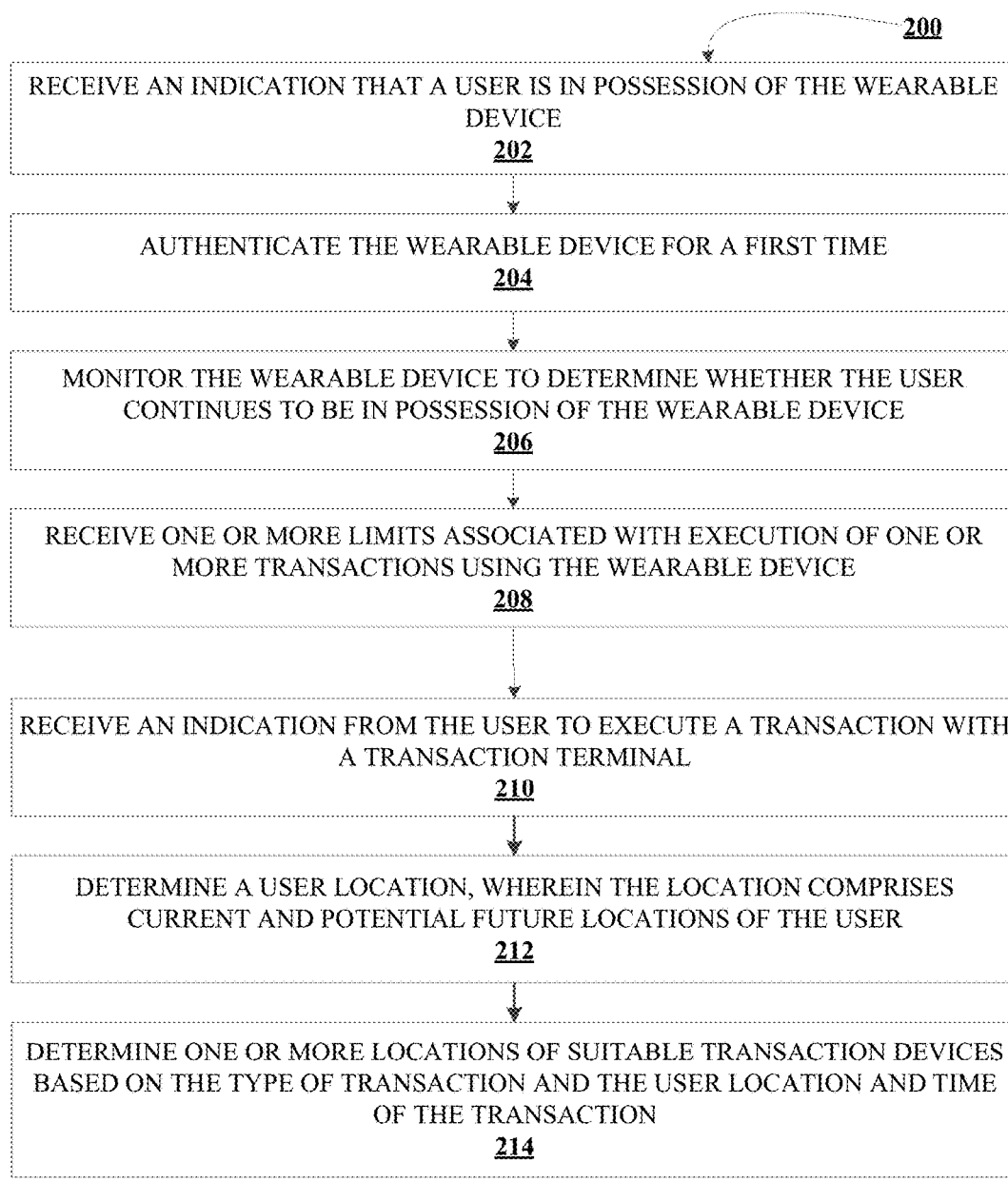
Figure 3:
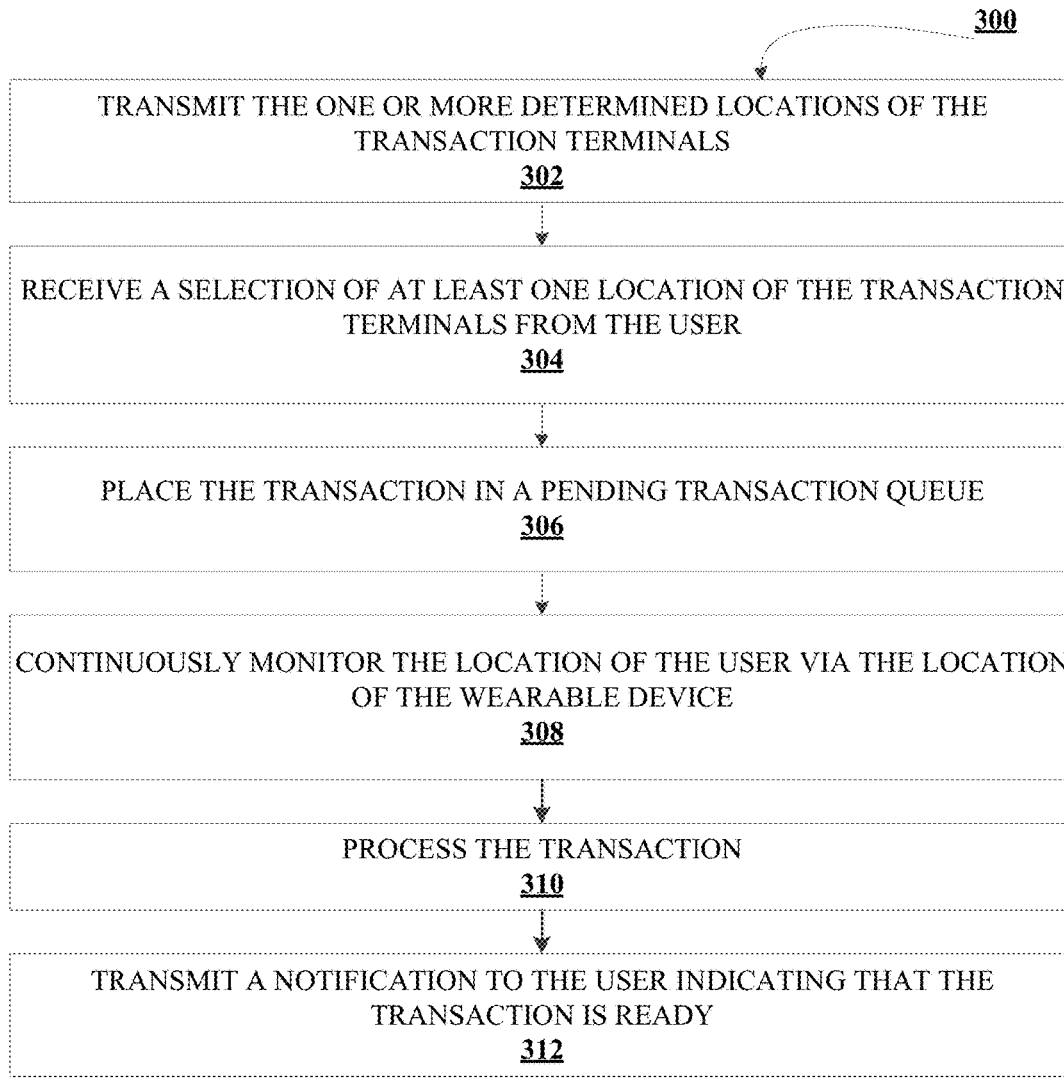
Figure 4:
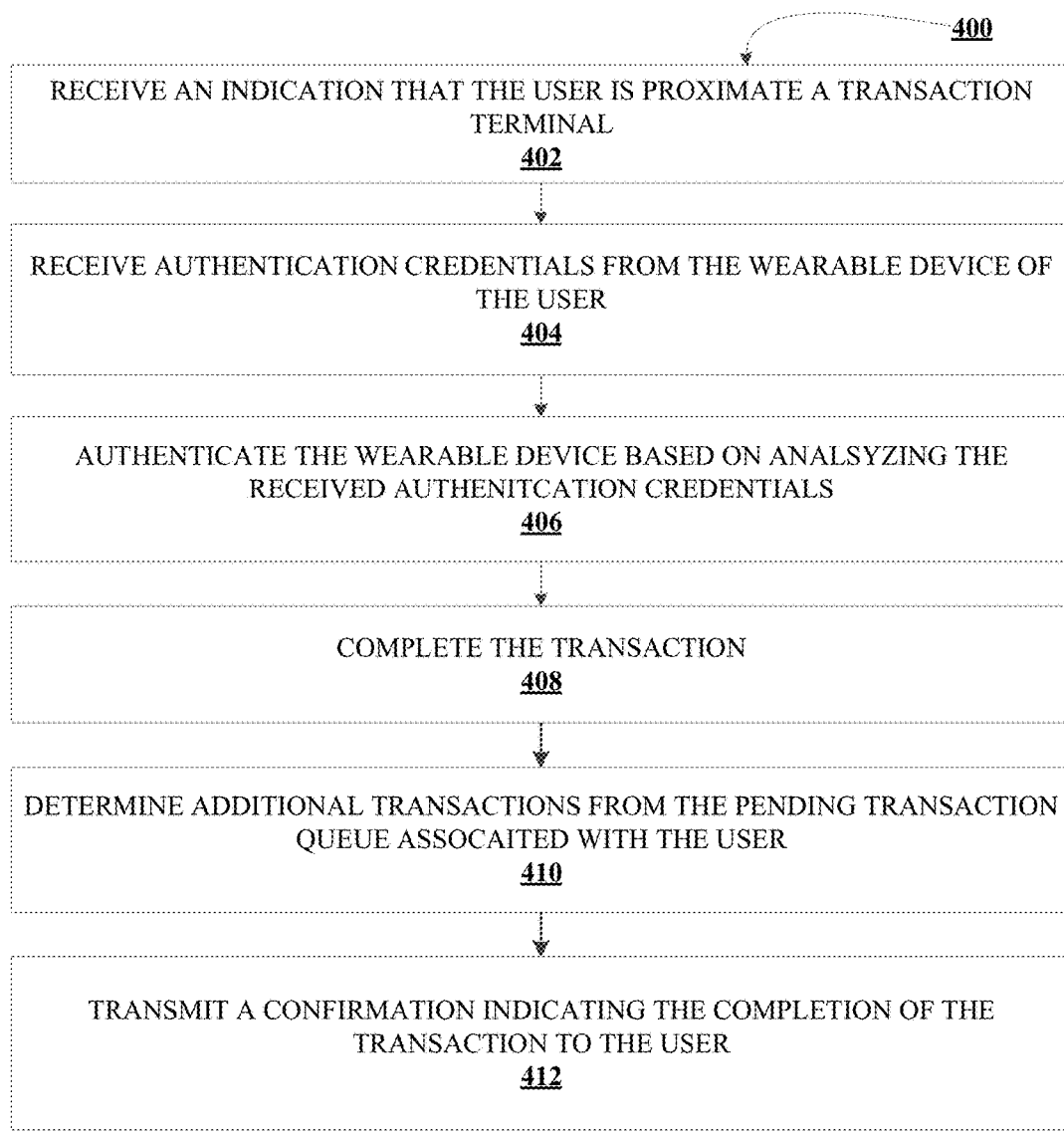

Having thus described embodiments of the invention in general terms, reference will now be made to the accompanying drawings, wherein:

FIG. 1 provides a an system environment for authenticating a wearable device for transaction queuing, in accordance with embodiments of the present invention;

FIG. 2 provides a high level process flow illustrating a process for authenticating a wearable device of the user;

FIG. 3 provides a high level process flow for placing the transaction in a pending transaction queue;

FIG. 4 provides a high level process flow illustrating a process for completing the transactions in a pending transaction queue, based on the pre-authenticated wearable device;

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

The embodiments described herein may refer to the initiation and completion of a transaction. Unless specifically limited by the context, a "transaction", "transaction event" or "point of transaction event" refers to any user completing or initiating a purchase for a product, service, or the like. The embodiments described herein may refer to an "advertisement." The embodiments described herein relate to solving a problem of transaction queuing and authentication for a customer. The present invention authenticates a user's wearable device for the first time, enables a user/customer to initiate transactions, places the transactions in a pending transaction queue, notifies the user when the transactions are ready and enables the user to complete the transactions at the transaction terminal, thus enabling convenient and short sessions by minimizing wait time and enabling transactions based on the authentication of the wearable device without requiring protracted authentication sessions. Continuous and real-time monitoring of the authentication of the wearable device of the user provides a higher level of authentication which are not possible with conventional means of authentication.

In accordance with embodiments of the invention, the term "entity" may refer to a customer, seller, merchant, or the like. In accordance with embodiments of the invention, the term "user" may refer to a customer or the like, who utilizes an external apparatus for executing transactions. In accordance with embodiments of the invention, the term "tap" or "tapping" may refer to bringing an external apparatus close to or within the proximity of an transaction terminal interface so that information can be communicated wirelessly between the external apparatus and the transaction terminal using short range wireless transmission technology, such near-field communication (NFC) technology, radio-frequency (RF) technology, or the like. Tapping may include physically tapping the wearable device against an appropriate portion of the transaction terminal or it may include only waving or holding the external apparatus near an appropriate portion of the payment terminal without making physical contact with the payment terminal.

In accordance with embodiments of the invention, the term "payment vehicle" may refer to an electronic payment vehicle, such as an electronic credit or debit card. The payment vehicle may not be a "card" at all and may instead be account identifying information stored electronically in a user device, such as in wearable device. In accordance with embodiments of the invention, the term "module" with respect to an apparatus may refer to a hardware component of the apparatus, a software component of the apparatus, or a component of the apparatus that comprises both hardware and software. In accordance with embodiments of the invention, the term "chip" may refer to an integrated circuit, a microprocessor, a system-on-a-chip, a microcontroller, or the like that may either be integrated into the external apparatus or may be inserted and removed from the external apparatus by a user.

In some embodiments a transaction terminal refers to one or more devices that facilitate execution of financial transactions. In this regard the transaction terminals can comprise Automated Teller Machines (ATMs), Point of sale devices (POS), vending machines, checkout registers, ticket vending machines, automated retail transaction devices, banking terminals in a financial institution and other transaction terminals that involve financial transactions in one form or another. In some embodiments the transaction terminal refers to devices that facilitate execution of non-financial transactions or activities, for example, check-in terminals for various industries, for example: hospitality, travel, healthcare and the like, information kiosks and other transaction terminals that do not involve a user performing a financial transaction via the transaction terminal. In some embodiments the transaction terminals enable execution of both financial and non-financial transactions/activities. Typically, the transaction terminals are owned by entities and are installed at suitable locations, such that the user can travel to the location of the transaction terminal to execute transactions. However in the present system, a user has to travel to the location of a transaction terminal, wait for the transaction terminal to be available if other users are present, authenticate the user, initiate a transaction and wait for the transaction to be completed. Typically transaction terminals require the user to perform one or more authentication steps based on the level of authorization desired for a particular transaction. For example the user may be required to slide cards with magnetic strips, provide one or more account numbers, userID and the like and the accompanying personal identification numbers (PIN), passwords, CVV numbers associated with the individual transaction terminal, provide biometric information, perform audio or visual challenges and the like. Furthermore, in addition to being time consuming due to undesirable wait times, the present system requires the users to authenticate themselves before transactions at every transaction terminal with credentials specific to the transaction terminal, making the process protracted and cumbersome. For instance a user may deposit a check at an ATM after providing authentication credentials and sliding an associated credit/debit card. Next when the user initiates a purchase transaction at a retail establishment or collects pre-paid tickets from a ticketing terminal, within a few minutes of the previous transaction, the user would have to perform authentication steps again. Subsequently the user would have to provide authentication credentials for other transactions carried out throughout the day, irrespective of the previous successful authentication steps. However, this protracted process only marginally increases the security and confidence of the transaction. The present invention provides a secure and accurate method of authorizing the user based on establishing an operative connection between one or more wearable devices of the user and the transaction terminal. As a result the user can execute transactions with an entity in a reliable, efficient and convenient manner, with increased confidence in the transaction both for the user and the entity.

Wearable devices, smart or otherwise, are becoming more prevalent in a variety of markets and industries. The devices are being used in many operations, such as but not limited to identifying a user, storage and transmission of credentials, storage and transmission of financial information, general user-data storage, and the like. In particular, wearable devices are used more and more to share user credentials and to perform financial transactions. The future of individual identification in consumer based industries will be led by the integration of wearable technology with authentication and identification in both physical and virtual environments. Most wearable devices communicate data through wireless local area networks, near field communication (NFC), radio frequency identification (RFID), and other wireless technologies.

FIG. 1 illustrates a wearable device authentication and transaction queuing system environment 100, in accordance with one embodiment of the present invention. As illustrated in FIG. 1, a system 108, for authenticating a wearable device for transaction queuing, is operatively coupled, via a network 101 to the user system 104, and to the transaction terminal 106. In this way, the system 108 can send information to and receive information from the user system 104 and the transaction terminal 106 to provide transaction queuing, authentication and execution for one or more users. Furthermore, the user system 104 and the transaction terminal 106 may be operatively coupled via the network 101. In this way the transaction terminal can identify or authenticate the user, transmit messages to the user, determine user's location and the like. Typically, the user system 104 comprises one or more user devices that may be in operative communication with each other. For example the one or more user devices can comprise auxiliary devices like mobile phones, tablets, smartphones, computers and wearable devices like smart watches, glasses, jewelry, fitness and activity monitors, devices implanted in the user's body and the like. In some embodiments, the wearable devices are configured to provide one or more means for determining parameters like location of the device (and/or the user), whether the user has adorned the device currently, a physiological parameter associated with the user, identification and/or authorization credentials of the user, gestures of the user and the like. In some embodiments the wearable devices comprise one or more transmitters and/or communication devices capable of transmitting parameters and/or receiving instructions and data from a remote system. "Remote System" in this regard may refer to system that that is capable of establishing a communication link between itself and the wearable device wirelessly (for example communication via the internet, over a network, by "tapping" the device at a terminal, without pressing buttons or other forms of tactile contact) and does not mandate that the devices must be located far away from each other, albeit that may be the case in some embodiments. In some embodiments the communication link is tangible foe example with wires, cords and other forms of circuitry. In some embodiments, the remote system may be an auxiliary user device, while in other embodiments the remote system may be a transaction terminal 106 or the system 108. FIG. 1 illustrates only one example of an embodiment of the wearable device authentication and transaction queuing system environment 100, and it will be appreciated that in other embodiments one or more of the systems, devices, or servers may be combined into a single system, device, or server, or be made up of multiple systems, devices, or servers.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101. The network 101 may also aid establishing an operative connection between otherwise incompatible devices, for example establishing a communication channel between the one or more user systems 104 and the transaction terminal 106 as illustrated by 101a. In this regard, the network 101 may take the form of contactless interfaces; short range wireless transmission technology, such near-field communication (NFC) technology, wireless personal area network, radio-frequency (RF) technology, or the like. Tapping may include physically tapping the external apparatus against an appropriate portion of the transaction terminal 106 or it may include only waving or holding the external apparatus near an appropriate portion of the payment terminal without making physical contact with the payment terminal.

In some embodiments, the user 102 is an individual that wishes to conduct one or more transactions with the transaction terminals 106 either currently or in the future. Typically the transactions terminals 106 are owned and operated by one or more entities and the user may be an individual who either has a relationship with the entity or seeks to establish a relationship with the entity. In this regard the user 102 may be a customer, a merchant or a person, employee, agent, associate, independent contractor, and the like associated with the entity. In some embodiments, the user 102 may access the system 108 through an interface comprising a webpage or a user application. Hereinafter, "user application" is used to refer to an application on the user system 104 of a user, a widget, a webpage accessed through a browser, and the like. In some embodiments the user application is a user system application 122 stored on the user system 104. In some embodiments the user application may refer to a third party application or a user application stored on a cloud used to access the system 108 and/or the transaction terminal 106 through the network 101. In some embodiments the user application is stored on the memory device 150 of the system 108. The user 102 may subsequently navigate through the interface, perform one or more searches or initiate one or more transactions using a user system 104. In some embodiments, a purchase may be made by the user 102 using the user system 104. In some embodiments, after one or more transactions are initiated by the user 102, the system 108 receives the initiated transactions and associated information and disseminates the transactions to appropriate transaction terminals based on analyzing the transaction and one or more user parameters. In some embodiments the transactions are initiated by the user devices directly in communication with the transaction terminal 106 and the information associated with the transaction is transmitted from the user device 104 to the transaction terminal 106. In some embodiments the transaction terminal 106 requests and/or receives additional information from the system 108 (for example from data storage 152) and/or the user system 104 for authenticating the user and/or the user device, determining appropriate transaction queues, performing the transactions and other functions.

FIG. 1 also illustrates the user system 104. The user system 104, herein referring to one or more user devices, wherein each device may generally comprise a communication device 112, a processing device 114, and a memory device 116. In the some embodiments the user system 104 comprises wearable devices as described previously, wherein the wearable devices may comprise one or more of the communication device 112, a processing device 114, and a memory device 116 or other additional devices. The user system 104 is a computing system that allows a user 102 to interact with other systems to initiate or to complete transactions for products and/or services redeemable at the transaction terminal 106. The processing device 114 is operatively coupled to the communication device 112 and the memory device 116. The processing device 114 uses the communication device 112 to communicate with the network 101 and other devices on the network 101, such as, but not limited to the transaction terminal 106 and the financial institution system 108. As such, the communication device 112 generally comprises a modem, server, or other device for communicating with other devices on the network 101. In some embodiments the network 101 comprises a network of distributed servers.

The user system 104 comprises computer-readable instructions 120 and data storage 118 stored in the memory device 116, which in one embodiment includes the computer-readable instructions 120 of the user system application 122. In this way, users 102 may authenticate themselves, initiate transactions, remotely communicate with the system 108 and/or the transaction terminal, authorize a transaction, and/or complete a transaction using the users' user system 104. The user system 104 may be, for example, a desktop personal computer, a mobile system, such as a cellular phone, smart phone, personal data assistant (PDA), laptop, wearable device (smart watches, glasses, jewelry, fitness and activity monitors) or the like. Although only a single user system 104 is depicted in FIG. 1, the system environment 100 may contain numerous user systems 104.

As further illustrated in FIG. 1, the system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 148 is operatively coupled to the communication device 146 and the memory device 150. The processing device 148 uses the communication device 146 to communicate with the network 101 and other devices on the network 101, such as, but not limited to the transaction terminal 106 and the user system 104. As such, the communication device 146 generally comprises a modem, server, or other device for communicating with other devices on the network 101.

As further illustrated in FIG. 1, the system 108 comprises computer-readable instructions 154 stored in the memory device 150, which in one embodiment includes the computer-readable instructions 154 of a system application 158. In some embodiments, the memory device 150 includes data storage 152 for storing data related to advertisement impressions and user transaction correlation, but not limited to data created and/or used by the system application 158. In some embodiments the transaction terminal device comprises a processing device 138 that is in operative communication with a memory device 140, communication device 136 and a communication interface 137. In some embodiments, the transaction terminal 106 comprises a, memory device 140 configured to store instructions 142, searchable and retrievable data, the transaction terminal application 144 and the like. The communication interface 137, in some embodiments is an interface used by the user to conduct transactions with the transaction terminal 106. The communication interface may include a display (e.g., a liquid crystal display, a touchscreen display, and/or the like) which is operatively coupled to the processing device 138 and the communication device 136. The communication interface 137 may include any number of other devices allowing the transaction terminal 106 to transmit/receive data to/from a user, such as a keypad, keyboard, touch-screen, touchpad, microphone, mouse, joystick, other pointer device, button, soft key, and/or other input device(s).

In some embodiments, the communication interface 137 of the transaction terminal 106 may include a contactless interface. In one embodiment, the contactless interface is an NFC interface. The contactless interface may be configured to contactlessly and/or wirelessly send and/or receive information over relatively short ranges (e.g., within four inches, within three feet, etc.). The contactless interface may include a transmitter, receiver, smart card, key card, proximity card, short-range radio technology (BLUETOOTH®) device, radio frequency identification (RFID) tag and/or reader, and/or the like. In some embodiments, the contactless interface communicates information via radio, IR, and/or optical transmissions. Generally, the contactless interface is configured to operate as a contactless transmitter and/or as a contactless receiver. The contactless interface functions to enable transactions with users utilizing an external apparatus, for example capable of contactless communication. Also, it will be understood that the contactless interface may be embedded, built, carried, and/or otherwise supported in and/or on the transaction terminal 106. In some embodiments, the contactless interface is not supported in and/or on the transaction terminal 106, but the contactless interface is otherwise operatively connected to the transaction terminal 106 (e.g., where the contactless interface is a peripheral device plugged into the transaction terminal 106, etc.). The contactless interface of the transaction terminal 106 is configured to contactlessly and/or wirelessly communicate information to and/or from an external apparatus, for example the user system 104.

The transaction terminal 106, may further comprise one or more additional devices to help execute transactions. For example the additional devices may be physical devices like printers to print documents, information, confirmation slips and the like; devices to store and retrieve one or more products dispensed at the transaction terminal 106; scanning devices to scan and retrieve data from received documents; ports to receive physical documents; image and video capture devices to help identify and authenticate the user; scanners to receive and process biometric identification credentials like fingerprint identification and voice identification.

In some embodiments the transaction terminal 106 comprises one or more transmitters or beacon devices. The transmitters may transmit audio signals, ultra high frequency inaudible signals, electromagnetic waves, short-range radio technology (BLUETOOTH®) signals and the like that contain encoded data in the vicinity of the transaction terminal 106. Typically the encoded data can be decoded only by specific applications or decoders in the user device 104. In some embodiments the transmitters are employed to authenticate the user 102 or the user device 104. For instance the transaction terminal may transmit signal with encoded data specific to a user device that other devices cannot recognize and/or decode. The user device 104 (for example a wearable device) may receive the encoded data and a specific decoding application in the customer application system 122 may decode the signal and transmit an augmented signal to a receiver on the transaction terminal. The augmented signal may comprise the decoded signal along with a token identifier of the device, one or more user parameters and the like. In some embodiments, the wearable device, the auxiliary device and/or the token are associated with one or more financial institution accounts. The processing device 138 may then analyze the augmented signal and authenticate the user based on authenticating the user wearable device, and allow the user to conduct transactions without seeking additional authentication credentials. In some embodiments the transmitters or beacon devices are used to determine if the user is proximate the transaction terminal 106. For example when the user is in the vicinity of the transaction terminal 106, the user device 104 may receive an encoded signal from the transmitter. In this regard the each transaction terminal 106 may have a unique encoded location code. The application on the user system 104 may then decode the signal and transmit a response to the terminal 106 or the system 108 as an indication of the user's location. In response the transaction terminal may choose to initiate pending transaction associated with the user; transmit a message to the user system 104 (for example: a wearable device or a smart phone) indicating a completed transaction that the user can receive; transmit an estimated waiting time for the pending transactions associated with the user, so that the user can return at a later time; transmit a map directing the user to the terminal 106 and/or a waiting area and any other suitable actions.

In the embodiment illustrated in FIG. 1 and described throughout much of this specification, the system application 158 may receive an indication that a user 102 accessed the system 108 through the user application. In some embodiments the system application 158 may receive an indication that a user 102 accessed the user application of another entity through operative communication with the transaction terminal 106 via the network 101. In some embodiments the system application 158, accessing the user data stored in the data storage 152, may receive authentication credentials from a user 102 and enable the user 102 to access the system through the user application by communicating with the user system 104. In some embodiments the transaction terminal application 144 may accessing the user data stored in the data storage 152 or data storage 118 of the user device 104, may receive authentication credentials from a user 102 and enable the user 102 to access the system 108 through the transaction terminal application 144. The system application 158 is further configured to monitor the user's navigation through the user application to determine one or more sections or pages of the application, accessed by the user 102. In this regard the system application 158, in conjunction with the database or data storage 152 may identify multiple dates and times in which the user 102 accessed a particular section or page of the application. This data may be used to determine user intent, user's calendars/appointments, user's interests, to build a user profile and transaction history so that the system 108 may assist the user most effectively. For example the system 108 may determine an appropriate transaction terminal 106 for a transaction based on current (by accessing a GPS device of the user system 104) or potential future locations of the user. In some embodiments the system application 158 determines a user profile, preferably stored in the memory device 150 to maintain data security, comprising the user's demographic information, authentication information (for example authentication credentials associated with the user and/or the user device), financial information, transaction history and the like.

A typical financial transaction executed by a user may require the user to present a payment vehicle (e.g., credit card, debit card, or the like) to the merchant to complete a transaction. During the process of executing the transaction, the merchant may require the user to provide additional authentication credentials to confirm the identity of the user. This may be in the form of a valid identification document, a signature, a personal identification number or the like. Although this form of identification confirmation during the process of executing the transaction may provide a sense of trustworthiness to the merchant, it may result in unnecessary inconvenience to the user. With users performing a multitude of transactions using wearable devices in the financial industry, there is a need to ensure security and convenience. Although wearable devices may be used as a form of a payment vehicle at contactless point-of-sale terminals at merchant locations, the merchant may still have to confirm the identity of the user adorning the wearable device at every interaction to determine the trustworthiness of the user and reduce the likelihood of misrepresentation.

The present invention allows the user and the wearable device to be pre-authenticated when initially adorned by the user such that the user may not be required to provide additional identification information or authentication credentials at a point-of-sale terminal of a merchant. In this regard, the user may initiate an authentication request via the wearable device when initially adorning the wearable device. This may be done using a combination of various authentication credentials input directly into the wearable device or by pairing the wearable device with an auxiliary device (e.g., mobile device or the like) and authenticating the wearable device indirectly using the auxiliary device. The wearable device may then be monitored using biometric feedback received using physiologic tracking technology incorporated into the wearable device that can read, record, and store individual biometric traits such as heart rate, blood pressure, gait, or other types of physical activity to determine whether the wearable device has remained in continual possession of the user since authentication.

Once authenticated, the user may approach a transaction terminal of an entity and use the wearable device as a form of payment vehicle to execute the transaction. Since the wearable device has been pre-authenticated by the user and is determined to have remained in continual possession of the user since authentication, the user may be provided with the convenience of using the wearable device as a digital key (i.e. one touch operation) to execute the transaction without the need to provide additional identification information or authentication credentials at a point-of-sale terminal of a merchant. Further, this sense of security also transfers to the merchants who accept transactions using such a wearable device. The pre-authentication and possession monitoring of the wearable device provides the merchant with an increased level of confidence and thus reducing the likelihood of misrepresentation. The process flows 200, 300 and 400 disclosed herein may be carried out by the processing device of the transaction terminal 106 independently or in communication with the system 108, by the processing device 148 of the system 108 or a suitable combination with the transaction terminal 106 and the system 108 each performing a portion of the steps.

FIG. 2 illustrates a high level process flow for authenticating the use of a wearable device to execute a transaction 200, in accordance with an embodiment of the invention. As shown in block 202, the process flow includes receiving an indication that the user is in possession of the wearable device. The indication may be based on initially detecting that the user has adorned the wearable device. Examples of potential wearable devices are smart watches, bands, earpods, jewelry, eyeglasses, contact lenses, clothing, and the like. In some embodiments, the wearable device may be associated with a token (e.g., an alias, substitute, surrogate, or other like identifier) as a replacement for sensitive account information. Typically, tokens or portions of tokens may be used as a stand in for a user account number, user name, pin number, routing information related to the financial institution associated with the account, security code, or other like information relating to the user account. The tokens may then be utilized as a payment instrument to complete a transaction.

Next, the process flow includes authenticating the wearable device for a first time, as shown in block 204 based on at least receiving the indication that the user is in possession of the wearable device. In some embodiments, the user may initiate an authentication request via the wearable device when initially adorning the wearable device. This may be done using a combination of various authentication credentials input directly into the wearable device or by pairing the wearable device with an auxiliary device (e.g., mobile device or the like) and authenticating the wearable device indirectly using the auxiliary device. The present invention provides the functional benefit of allowing the user and the wearable device to be pre-authenticated when initially adorned by the user such that the user may not be required to provide additional identification information or authentication credentials at multiple transaction terminals. In some embodiments, authenticating a wearable device may comprise sending an authentication request to the system and/or an entity (for example: a financial institution, an employer, a merchant, a government agency) to associate (e.g., enroll) the wearable device with the user and or the user's relationship with the entity (for example: online banking account with a financial institution, frequent flyer program with an airline, healthcare association with an healthcare provider, license number with the department of motor vehicles and the like). In some embodiments the wearable device is authenticated with respect to a primary financial institution account of the user with a first financial institution and this pre-authenticated wearable device association is then used to authorize financial transactions with the primary financial institution, other financial institutions accounts, other financial entities, merchants, service providers and the like and to authorize non-financial transactions with other entities. In this regard the entities may have agreements, contracts and/or arrangements with the first financial institution, so that the pre-authentication is accepted with a high degree of confidence. In some embodiments authenticating the wearable device comprises associating the wearable device with the user. For example the association may be based on comparing or matching the device information associated with the wearable device with user information associated with the user and user's online banking account. Continuing with the example, the user may be authorized to access the online banking account using the wearable device to execute one or more transactions.

In this regard, the system may be configured to receive an authentication request from the user. In some embodiments, the wearable device may be paired with an auxiliary device associated with the user. In these instances, the system may be configured to receive the authentication request from the user via an application or via a banking website downloadable on the auxiliary device. In this regard, the system may be configured to receive one or more authentication credentials from the user via the auxiliary device and authenticate the user based on the received authentication credentials. In response to successfully authenticating the user and the auxiliary device, the system may automatically authenticate the wearable device paired or communicably linked to the auxiliary device. In some embodiments, the authentication request may be submitted by the user using the wearable device directly, or an auxiliary device previously paired to the wearable device. Typically, the wearable device may be securely paired with an auxiliary device by establishing a secure channel between the two unassociated devices over a short range wireless communication channel. In this way, a secure communicable link is created between the wearable device and the auxiliary device utilizing system application directives.

The authentication request includes device information associated with the wearable device and user information associated with the user and user's online banking account. The device information associated with the wearable device may be any information sufficient to generate a device "fingerprint", or a unique signature of the user's wearable device. The user information may be any information sufficient to identify the user and the user's online banking account. In some embodiments, the user information may include, but is not limited to, at least one of a username, contact information, a password, a PIN number, biometric information (e.g., physiological features such as fingerprints, finger vein and palm vein patterns, as well as iris and facial recognition to verify individual identities), a unique identification number associated with the user, social network information, an account number, or a card number. In some embodiments, the user information may be proprietary to the financial institution, such as an account number, a reference number to an account, a client number, or the like. In other embodiments, the user information may be public information, such as a phone number, mailing address, email address, or the like. In some embodiments one or more tokens are stored on the wearable device of the user. The tokens can comprise information associated with the user information and/or the device information. In this regard the wearable device may comprise one or more applications that enable the tokens to be transmitted to the transaction terminals.

In some embodiments, the tokens may actually be stored on the wearable device. When the wearable device is used in a transaction, the token stored on the device may be used to enter into the transaction with the merchant. In other embodiments, the token may not be stored on the wearable device, but instead the token may be stored in the cloud of the provider of the wearable device (or another third party). When the user enters into a transaction with a merchant, transaction information is collected and provided to the owner of the cloud to determine the token, and thus, how the transaction should be processed.

In some embodiments a user may adorn a wearable device and initiate pairing of the wearable device with an auxiliary device. In this regard, the auxiliary device (for example: phone number) may be already registered with one or more financial and non-financial relationships of the user, and the system may automatically access the servers of the associated entitles, by accessing an extracting information from the auxiliary device, and update the databases of the entitles with the data associated with the wearable device pairing (for example: a wearable device identifier, a wearable device token or a token associated with one or more user accounts). In some embodiments the user may add one or more register the wearable device with one or more entities. Therefore, in some embodiments the transaction terminals associated with the entities can recognize the token received from the wearable device, and associate it with the user's relationship with the entity, in case of universally accepted tokens. While in other embodiments, the system may initiate generation of tokens specific to each of the one or more entities and/or transactions (for examples tokens accepted by the transaction terminals of the one or more entities), either prior to or after the initiation of a transaction, and transmit them to the wearable device either directly or via the auxiliary device, in the case of personalized tokens. Hence, in some embodiments, the system establishes a link between the auxiliary device and the wearable device such that the wearable device can retrieve the data, in real time, from the servers of entities that is accessible to the auxiliary device either directly or by receiving the data via the auxiliary device without repeated authentication, the wearable device can be used to authenticate and/or initiate transactions and/or the wearable device can be used to carry the user's credentials for various entities.

For example, in some embodiments the user may authenticate a wearable device, either directly or via an auxiliary device by providing authentication credentials for a first time. The system may then generate a token and transmit the token to the wearable device for use in transactions. In this regard the tokens may be pre-authorized and could be used for transactions as long as certain parameters are satisfied. For example the pre authentication may be valid as long as the user adorns the wearable device and the user may have to provide authentication credentials to authenticate the wearable device on wearing the device after removal from his/her person. As another example the user and/or an entity may determine that the pre-authenticated token is valid for certain transaction types. As another example the pre-authentication may be valid for a time period of 12 hours, and the user may perform a plurality of transactions in that time period without having to provide authentication credentials repeatedly.

The process flow 200, includes determining that the user continues to remain in possession of the wearable device based on at least continuously monitoring the wearable device from the first time, as shown in block 206. The wearable device may then be monitored using biometric feedback received using physiologic tracking technology incorporated into the wearable device that can read, record, and store individual biometric traits such as heart rate, blood pressure, gait, or other types of physical activity to determine whether the wearable device has remained in continual possession of the user since authentication. In some embodiments, any variation in optimal or customary parameters of the user may warrant a second authentication before a transaction is processed using the wearable device. This may be accompanied by notifying the user on one or more user devices and auxiliary devices to ensure that the user can authenticate the wearable device if the device was removed inadvertently or in error or to ensure that the user can take appropriate actions if the variation in parameters occurred without the user's knowledge. This continuous and real-time monitoring of the possession of the wearable device provides a higher level of authentication. This is an improvement over conventional means of authentication of payment devices, for example swiping a magnetic strip of a payment card, since, the possession of the payment devices cannot be ascertained at all, much less in real time and with accuracy.

The user may then initiate one or more transactions with entities. The user may scan the wearable device to cause transmission of the token at a first transaction terminal of a first entity, and the transaction terminal may authenticate the user and complete the transaction without requesting additional authentication credentials based on determining that the user has been in continued possession of the wearable device since the pre-authentication. The user may then visit a second transaction terminal associated with a second entity and the user's wearable device may transmit a token to the second transaction terminal. The second transaction terminal may authorize the user based on the received token directly and complete the transaction. In some embodiments the second transaction terminal may request confirmation from the first entity before authenticating the user on determining that the token received is pre-authenticated based on a relationship the user has with the first entity.

Next, the process flow includes receiving one or more limits or parameters associated with execution of one or more transactions using the wearable device, as shown in block 208. In some embodiments, the wearable device themselves, or the user accounts, individual users, tokens associated with the wearable device, or the like associated with the user, may have limitations that limit the transactions that the users may enter into using the wearable device. The limitations may include, limiting the transactions of the user to a single merchant, a group of multiple merchants, merchant categories, single products, a group a products, product categories, transaction amounts, transaction numbers, geographic locations, or other like limits. The limits may be placed on the wearable device by the user, or another entity (e.g., client, administrator, person, company, or the like) responsible for the transactions entered into by the user using the wearable device. The generation of the token may occur at the time of the transaction or well in advance of the transaction, as a one-time use token or multi-use token. In some embodiments, the one or more limits are associated with a purchase program. In this regard, the user may execute transactions with a set of preselected merchants using the authenticated wearable device without the need for additional authentication at the point of sale terminal. In some embodiments, the user may specify one or more preference parameters, i.e. the one or more limits, comprising transaction type, preferred time range, preferred location radius and the like. In other embodiments the system may automatically determine preference parameters. In some embodiments the one or more limits comprise at least a spending limit, a threshold on a number of transactions, a time limit, a merchant category, a product category, and/or a geographic location Next, as shown in block 210, the process flow includes receiving a request or an indication from the user to initiate a transaction using the wearable device. In some embodiments, the user may use the auxiliary device to initiate the transaction. In some embodiments, the user may transmit an indication to execute a transaction using the wearable device. In this regard, in some embodiments, an online interface associated with an entity may be presented to the user either on the auxiliary device or on the wearable device, the user may log on to the online banking system by inputting user login credentials into the user login interface or by using tokens already stored on the device. The user login credentials and/or tokens are received by the system and are evaluated against an entity credentials database. A determination is made as to whether the current user is authorized to access the entity system based on the received user login credentials. If the user is authorized to the online banking system, then the user is allowed to access the entity system and initiate one or more transactions, specifically transactions that require completion at a transaction terminal. In some embodiments, the user may specify one or more preference parameters comprising transaction type, preferred time range, preferred location radius and the like. In other embodiments the system may automatically determine preference parameters.

The transactions may be financial transactions, for example the user may be travelling abroad and may require money in the form of coins or notes in a different currency, the user may then initiate a transaction for the required amount and denominations either beforehand or enroute to the airport to be picked up at a transaction terminal at airport before the user's scheduled travel. As another example, the user may be shopping at a retailer, the system may track the items that the user has placed in the cart and create a dynamic transaction that is constantly updated and that would be fulfilled at a check-out terminal. The payment for the financial transactions may be processed either during initiation of the transaction or at a transaction terminal during the completion of the transaction. In some embodiments the transaction may be a non-financial transaction. For example, the user may seek an appointment with a healthcare professional. The system may automatically initiate a check-in transaction for the user at the location of the appointment. In this regard the transaction terminal may be configured to determine one or more physical parameters of the user (height, weight and the like), generate and print one or more documents required for the appointment (for example: prefilled insurance forms, or documents for the user to sign) or perform any other transaction that is required for the appointment. As another example, the user may purchase tickets for a show and initiate a transaction to pick up the tickets prior to the show at a transaction terminal. As another example, the user may be travelling via an airline. The user may check-in a few hours prior to the departure and indicate that the user has a certain number of bags. A transaction may be initiated for the user to pick up luggage tags, boarding passes and the like at a transaction terminal at the airport thereby reducing the time required for check-in. In some embodiments, the process flow then includes determining that the transaction is within the one or more limits associated with the wearable device based on at least the transaction information. In one aspect, the one or more limits assigned to the wearable device (or the token stored on the wearable device) may be part of the purchase program to enable the user to execute transactions with the merchant (also part of the purchase program) using the authenticated wearable device without the need for additional authentication. In some embodiments, the transaction information may assist in determining if the transaction meet or violate limits associated with the wearable device. If the transaction (e.g., transaction information) fails to meet a limit, the transaction may be denied. Alternatively, if the transaction (e.g., transaction information) meets a limit, then the transaction may be allowed.

Next as illustrated at block 212, the system determines a user location. The user location can comprise a current location of the user or potential future locations of the user. In some embodiments, the system may be configured to determine the location of the user using a location determining device associated with the wearable device, such as Global Positioning System (GPS) location determining mechanisms or the like. In this way, the system may be configured to determine that the user is within a predetermined distance from a transaction terminal associated with the initiated transaction. In some embodiments the system determines one or more potential future locations of the user by accessing the user devices or other sources. The system may determine potential future locations based on the user's appointment calendars, social media feeds, transaction history, location history and the like. In some embodiments the user location is linked to the initiated transaction. For example, if the transaction relates to an appointment, the system determines a user location at or proximate to the appointment location. As another example, if the initiated transaction involves renewal of the user's driver's license, the system may determine user locations to be the locations of one or more motor vehicle offices that offer renewals. In some embodiments the user location is determined based on the user's office or home addresses.

Next as illustrated in 214, the system determines one or more locations of transaction terminals. In this regard the system may determine one or more optimum locations of transaction terminals based on determined suitable preference parameters. These parameters may include type of transaction, time of the transaction, user location, entity owning the transaction terminal and the like. These parameters can be received from the user before or during initiation of the transaction or can be determined by the system based on analyzing a user profile comprising user's demographic information, transaction history, financial information and the like. For example, the system may retrieve the home and office addresses of the user and seek transaction terminals within a predetermined radius. In another embodiment of the invention, the system accesses the calendar on the user device to determine potential future locations of the user. For instance if the system determines that the user will travel elsewhere on a particular day and a particular time, the system then looks for transaction terminals with availability at the appropriate time. As another example, the transaction terminal if the transaction involves retrieving currency from an ATM (i.e. the transaction terminal), the system determines one or more suitable locations of transaction terminals based on the user's relationships with one or more financial institutions. In some embodiments the system may determine a plurality of transaction terminals (for example within the user's city) and rank them based on suitable criteria comprising minimum travel distance, minimum travel time, convenience, parking availability, proximity to public transport and the like, either singularly or in combination. In some embodiment the system requests the criteria from the user, while in other embodiments the system may automatically determine the optimum criteria based on analysis of the user profile. For example the system may determine that the user travels by car, and may determine the approximate driving time to each of the plurality of transaction terminals based on the approximate traffic trends at the time and day. In this regard the system may determine three locations A, B and C with A being the most suitable based on travel time. However, the system may determine from the user's calendar or user profile that the user has a second task/transaction to be completed on the day. The system may determine that the user can complete both the initiated transaction and the second task at location B and therefore, the system may determine location B to be the optimal location. In some embodiments the system may determine that the user may complete one or more tasks at a location, with less time spent or with less distance travelled by modifying the user's preference parameters and the system may notify the user and seek confirmation before determining an optimal transaction terminal location based on the modified preference parameters.

Now referring to block 302, of the high-level process flow 300, illustrated in FIG. 3, the system transmits the one or more determined locations of the transaction terminals to the user system 104. In this regard the system may transmit the locations and the associated preferred parameters and suitable criteria. In some embodiments the system may enable the user to modify the preferred parameters and/or the suitable criteria and the system may determine new locations of transaction terminals based on the modification. In some embodiments, the system enables the user to input a specific location and/or time associated with the initiated transaction. The system may then transmit the availability and approximate wait times at the specific location. In some embodiments the system transmits the determined location to the user's wearable device, while in other embodiments the system transmits the determined locations to the user's auxiliary device based on determining that the user continues to be authenticated by adorning the wearable device. Next, as illustrated by block 304, the system receives a selection of a transaction terminal from the user. In some embodiments the user may select multiple transaction terminals. In this regard the system may enable the user to execute the transaction at any of the terminals, such that the use can execute the transaction based on convenience.

As illustrated by block 306, the system places the transaction in a pending transaction queue. In this regard one or more pending transactions are stored the queue until it is accessed by/executed by at least one transaction terminal. When a user is ready to complete the pending transaction, the pending transaction is retrieved from the queue and is completed by the transaction terminal. In some embodiments the system determines a suitable initialization time and/or a finalization time for each of the pending transactions in the queue. In some embodiments the pending transaction queue is a searchable and retrievable queue. In some embodiments the queue is a centralized, real time queue, stored in the data storage 152, accessible by one or more transaction terminals. While in other embodiments, each transaction terminal may comprise individual queues with transactions expected to be performed at the individual transaction terminals. Next, as shown in block 308, the process flow includes monitoring the wearable device to determine whether the user continues to remain in possession of the wearable device. In this regard, the system may be configured to monitor the variety of sensors associated with the wearable device and the stimuli that they correspond to (e.g., physiological vital signs, temperature, body movements, organic substances, or the like). In some embodiments, the sensors may be monitored periodically to determine possession. In instances where the wearable device is paired with an auxiliary device, the system may be configured to monitor the auxiliary device and determine whether the mobile device continues to be paired to the wearable device. In this regard, the wearable device may be monitored based on at least determining a location of the auxiliary device paired to the wearable device using global positioning data, such as accessing auxiliary device global positioning systems (GPS) or the like. Global positioning data may include any information collected from methods, systems, apparatus, computer programs, or the like involving locating a position of the user's auxiliary device relative to satellites, fixed locations, beacons, transmitters or the like. In some instances, global positioning data may be collected from a GPS device, such as a navigation system. Such a navigation system may be, but is not limited to, hardware and/or software that is part of the auxiliary device. In response to determining the location of the auxiliary device and that the auxiliary device is still paired with the wearable device, the system may be configured to determine that the user continues to remain in possession of the wearable device.

In some embodiments, both the auxiliary device and the wearable device may be concurrently monitored to determine that the user continues to remain in possession of the wearable device. If it is determined that the first authentication is no longer active, the system may transmit a notification to the user's wearable and/or auxiliary devices and request that the user authenticate himself/herself either prior to the transaction or at the transaction terminal. In some embodiments the system may remove the transaction from the queue or flag the transaction if the user's authentication requirement is not met. In some embodiments, the wearable device may only have to be authenticated once at a first time stamp. The wearable device may then be continuously monitored to determine whether the user continues to remain in possession of the wearable device from the first time stamp when the wearable device is authenticated until a second time stamp when receiving the request to initiate a transaction. In instances where the wearable device is paired with an auxiliary device, the system may determine the location of the auxiliary device and then determine whether the auxiliary device continues to remain paired with the wearable device. In response, the process flow 300 includes processing the transaction, as shown in block 310. Processing the transaction may comprise retrieving data associated with the transaction from the system 108 and storing the data in a cache memory in the memory device 138 for easier and faster access during the execution of the transaction. In some embodiments, processing the transaction may comprise procuring and/or reserving one or more products associated with/or required for the transaction. In some embodiments, based on determining the continued authentication of the user, processing the transaction may comprise processing payment associated with the transaction. In other embodiments, the processing the transaction may comprise transmitting the transaction to the associated transaction terminals and removing the transaction from the pending transaction queue. In some embodiments processing the transaction comprises at least partially processing/completing the transaction. Typically processing the transaction involves dividing the transaction into discrete steps and ensuring that the user can complete all the steps at the user's next visit to the transaction terminal without additional visits. In this regard if the transaction terminal determines that completion of one or more steps requires additional input, the system may transmit reminders to the user to provide the input prior to the transaction.

Next, the system transmits a notification to the user based on processing the transaction as illustrated in block 312. In one aspect, the notification may be presented to the user on the wearable device. In another aspect, the notification may be presented to the user on the auxiliary device paired to the wearable device. The notification may be a pop up message, an audible alert, a vibratory alert, or the like. In some embodiments, the notification may be appended with one or more offers for the user, the offers being associated with the merchants determined to be proximate to the user. In some embodiments the notification may be based on determining the location of the user. In this regard the system may analyze the GPS coordinates of the user devices, or analyze video feeds from the user devices to determine that the user is currently proximate to a transaction terminal, irrespective of the initial time frame/location of the transaction. In some embodiments the system determines that the user is proximate to a transaction terminal based on interaction between the user auxiliary/wearable device with the transmitter/beacon devices at or around the location of the transaction terminal. The system or the transaction terminal may then transmit a notification to the user indicating that the transaction is ready based on determining the availability of the transaction terminal. In the transaction terminal is currently executing the transaction for a different user, the system may determine an approximate start time and completion time of the current transaction and my transmit a notification to the user indicating that the transaction will be ready in a certain time like 2 minutes, 5 minutes and the like. In this regard the system may determine the approximate start time based on durations of other scheduled transactions, the number of people waiting at the terminal based on analyzing live video stream and other similar factors. The system may determine the approximate completion time of the transaction based on the type of transaction, historical duration required for the steps in the transaction and the like. In some embodiments, the notification transmitted to the user's wearable device, wherein the notification is vibratory, audio, and visual or a combination to engage the user's attention. In some embodiments the notification can comprise a route map from the user's location to the transaction terminal, wherein the route map may be audio/visual or vibratory. The system may determine whether the user is currently driving, on foot or using public transport and determine an appropriate route map. In some embodiments the system continuously monitors the user's progress and may notify the user and/or automatically readjust the route map, in real-time, when the user deviates from the initial route. In some embodiments the system may direct the user to a waiting area when the transaction terminal is occupied and notify the user when the transaction terminal is available to process the user's transaction.

The user may then approach the point-of-sale of the merchant to execute a transaction as illustrated in block 402, of the high level process flow illustrated in FIG. 4. In some embodiments system may receive an indication from the user indicating that the user is ready to execute the transaction. The user may provide this indication from the wearable device and of the auxiliary device. While in other embodiments the system may automatically determine that the user is proximate the transaction terminal, similar to steps described above. In some embodiments the indication is received by the user scanning the wearable device at the transaction terminal as illustrated at block 404. In some embodiments the user may orient the wearable device or perform some gestures such that the device can be identified and authenticated tokens can be transmitted or the user may simply tap the wearable device against the transaction terminal. In other embodiments, the transmission of authentication credentials from the wearable device to the transaction terminal is seam less and automatic, for example, the authentication credentials may be automatically transmitted when the user is determined to be proximate and opposite the transaction terminal. For example, the system may determine that the user is in front of the terminal, within a predetermined distance (for example: within two feet) by analyzing audio and video feeds of the area surrounding the transaction terminal by employing facial recognition or analyzing the user's GPS coordinates. As another example the system may automatically cause transmission of authentication credentials or tokens from the wearable device to the transaction terminal, based on interaction between one or more transmitter or beacon devices and an application stored on the wearable device/auxiliary device of the user. Transmitter/beacon devices may be used in conjunction with GPS monitoring and facial recognition for precise and accurate determination of the user's location. Therefore, the system establishes an operative communication link between the wearable device and the transaction terminal, devise that cannot communicate otherwise. Next, the system authenticates the wearable device and/or the user at block 406. The transaction terminal may receive one or more tokens stored on the wearable device, identify the user, correlate the user with one or more pending transactions authenticate the user based on the pre-authenticated wearable device and/or token and initiate the transaction. Typically the system automatically authenticates the user based on comparing the received one or more tokens from the wearable device to database of authentication credentials and determining that the user has been in possession of the wearable device since the first authentication, continued authentication of the wearable device and the like. However, in some embodiments, the system may request authentication credentials from the user for higher levels of authentication (for example if the user initiates a new transaction at the terminal which requires a higher level of authentication than the pre-authenticated wearable device) and to confirm authentication for example for flagged transactions.

Next, as shown in block 408, the process flow includes completing execution of the transaction based on at least determining that the transaction is within the one or more limits and that the user continues to remain in possession of the wearable device from the first time. After ascertaining the authentication of the wearable device, the system may present a personalized interface to the user on the transaction terminal. The personalized interface may comprise information about the pending transactions of the user, at least a portion of the user profile, other transactions that the user may be interested in (determined based on analyzing the user profile and/or the pending transactions of the user), one or more offers associated with the transactions and the like. In this regard the user may choose to complete the finalized transaction, initiate new transactions, choose one or more offers, specify an order for the completion of transactions or the like. Presenting the interface and competition of the transactions is explained below in detail. After the user is authenticated at the transaction terminal, the transaction terminal queries the pending transaction queue as to whether any pending transactions associated with the user, wearable devices tokens comprising the user's bank account(s) and/or the identification means supplied to the transaction terminal are stored in the pending transaction queue. In response to this query, a determination is made as to whether any such pending transactions are stored in the pending transaction queue. In some embodiments if a determination is made that no pending transactions is stored in the queue, the system enables the user the user may perform other transactions.

If a determination is made that at least one pending transaction is stored in the queue, an interface is presented to the user for the user to confirm at least one of the pending transactions. In the event that more than one transaction is stored in the queue, the interface may inquire as to which pending transactions should be performed. In response, the user may select one or more pending transactions for the transaction terminal to complete. A response from the user as to whether the user has selected or confirmed a pending transaction is received by the transaction terminal. If no pending transaction is selected or confirmed, the system enables the user to perform other transactions at the transaction terminals.

If one or more pending transactions are selected and/or confirmed to be completed, the pending transaction(s) that were selected and/or confirmed by the user is retrieved from the queue and completed, as shown in block 408. Then, the pending transaction(s) that were retrieved and completed are removed from the banking queue in some embodiments. If the one or more transactions were not completed or only partially completed the system marks the transactions with an identifier (for example indicating the percentage completion of the transaction or type of error and the like) and enables the transactions to remain in the queue. In this regard the pending transactions may be placed in the queue indefinitely or for a predetermined amount of time. The user may be notified about the status of the pending transactions and periodically reminded to complete the transaction at a transaction terminal. The system may then query the queue for any more pending transactions as illustrated by block 410. If the system determines additional pending transactions other than the transactions that were attempted but only partially completed or not completed, the system may execute step 408 again. This process may continue until no more pending transactions are stored in the queue. In some embodiments the system may execute the pending and/or one or more new transactions received from the user based on determining that the transactions do not exceed the limits from block 208. While in other embodiments the system may complete the transaction based on determining that the user continues to adorn the wearable device from the first time and/or the pre-authentication of the wearable device is still valid.

In some embodiments, the system may automatically complete one or more of the pending transactions stored in the queue, immediately after the authentication of the wearable device at block 406, such that no user input would be required. To set up such an automatic processing of the pending transaction, the user may be able to associate such automatic processing with the pending transaction prior to or during initiating the transaction. In some embodiments, the system may complete the transaction after receiving user input. For example, if the transaction involves generating signed documents for the user, the system may request that the user read the one or more documents on the personalized interface and provide a signature, in the form of an autograph, initials, fingerprint or the like, on the interface before completion of the transaction, i.e. printing the documents. In some embodiments, completion of the transaction may involve dispensing currency, printing personal checks, money orders or cashier's checks, dispensing one or more products, tickets and the like, printing documents, capturing the image and/or biometric information of the user for processing (for example for generation of an identification card), check out during automated retail, directing the user to a table at a restaurant and the like. In some embodiment's completion of the transaction comprises modifying the user's account preferences, account transfers, deposits and the like. In some embodiments, once the transactions have been completed the system ceases the presentation of the personalized user interface and terminates the session so as to preserve the security and privacy of user's session. The user or another customer may begin a new session either by initiating the transaction at block 210 or by providing authentication credentials from the wearable device at block 304. Next, the system may transmit confirmation of the transaction to the user as illustrated by block 412. The confirmation may be transmitted to the wearable device or auxiliary device of the user. The confirmation may be in the form of an email, text message, encoded signal transmitted via a transmitter/beacon device and decoded and displayed by the user device, postal mail, phone call and the like. In some embodiments the confirmation may be a physical document printed at the transaction terminal. The confirmation may comprise a summary of the completed transactions, one or more pending transactions, time, date and location of the transaction and any other appropriate information.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described.

To supplement the present disclosure, this application further incorporates entirely by reference the following commonly assigned patent applications:

| U.S. patent application Ser. No. | Title | Filed On |
| --- | --- | --- |
| 14/842,303 now published as 2017/0061424 | AUTHENTICATION SYSTEM USING WEARABLE PRESENCE TO MAINTAIN ACCOUNT AUTHENTICATION | Concurrently Herewith |
| 14/842,310 now published as 2017/0061423 | USE OF WEARABLE AS AN ACCOUNT CONTROL SYSTEM | Concurrently Herewith |
| 14/842,781 now published as 2017/0061422 | A SYSTEM FOR AUTHENTICATING THE USE OF A WEARABLE DEVICE TO EXECUTE A TRANSACTION | Concurrently Herewith |
| 14/842,791 now published as 2017/0061414 | A SYSTEM FOR AUTHENTICATING A MOBILE DEVICE FOR COMPREHENSIVE ACCESS TO A FACILITY | Concurrently Herewith |

What is claimed is:

1. A system for pre-authentication and possession monitoring of a wearable device, wherein the system is configured for authenticating a wearable device for transaction queuing, the system comprising:
    at least one memory device;
    at least one communication device connected to a distributed network;
    at least one processing device operatively coupled to the at least one memory device and the at least one communication device; and
    a module stored in the at least one memory device comprising executable instructions that when executed by the at least one processing device, cause the at least one processing device to:
        receive an indication that a user is in possession of a wearable device, the wearable device being associated with a token, the token being associated with the user;
        authenticate the wearable device at a first time based on at least receiving the indication that the user is in possession of the wearable device, wherein authenticating the wearable device comprises authentication of the token;
        receive an indication that the user wishes to execute a first transaction at a transaction terminal;
        determine a first user location, wherein determining the first user location comprises analyzing at least a user profile of the user;
        determine one or more locations of transaction terminals based on at least a transaction type associated with the first transaction and the first user location;
        receive a selection of at least one location of the one or more locations of transaction terminals from the user through the wearable device, wherein receiving the selection comprises the user initiating the transaction;
        place the first transaction in a pending transaction queue, wherein the pending transaction queue comprises other pending transactions received from the user and/or one or more other users;
        process the first transaction, wherein processing the first transaction comprises at least partial completion of the first transaction;
        transmit a notification to the wearable device indicating that the transaction has been processed, wherein transmitting the notification further comprises:
            determining a second user location that is within a predetermined distance from the transaction terminal, based on communication with the wearable device;
            analyzing a live video stream associated with the transaction terminal to determine a number of other users waiting at the transaction terminal;
            determining a start time associated with the first transaction based on at least the number of other users waiting at the transaction terminal and retrieving scheduled transactions at the transaction terminal;
            determining an end time associated with the first transaction based on at least the transaction type associated with the first transaction and historical durations of the transactions at the transaction terminal; and
            transmitting the notification to the user wearable device comprising at least the approximate start time, the approximate end time and a route map;
        wherein the route map directs the user to the transaction terminal or a waiting area;
        receive the previously authenticated token from the wearable device at the transaction terminal and authenticate the user without requiring additional authorization credentials, wherein the transaction terminal is associated with the received selection of the at least one location;
        in response to authenticating the user without requiring additional authentication credentials, complete execution of the first transaction based on at least determining that the first transaction is within one or more limits associated with one or more transactions and that the user continues to remain in possession of the wearable device from the first time, wherein determining that the user continues to remain in possession of the wearable device further comprises at least (i) identifying continuously, via one or more sensors of the wearable device, physiological vital signs of the user comprising at least one of heart rate, blood pressure, gait and physical activity of the user, and (ii) identifying a continuous short range wireless communication link between the wearable device and an auxiliary device from the first time; and
        transmit a confirmation indicating the completion of the first transaction to the wearable device.

2. The system of claim 1, wherein the module further comprises instructions that cause the at least one processing device to:
 establish an operative communication link between the wearable device and the transaction terminal;
 electronically receive an indication that the user has scanned the wearable device at the transaction terminal;
 retrieve the token associated with the wearable device based on at least receiving the indication that the user has scanned the wearable device at the transaction terminal, wherein the token comprises user identification information; and
 complete authentication of the user using token information associated with the token.

3. The system of claim 1, wherein completing the transaction further comprises:
 determining, automatically, a second transaction from the pending transaction queue, wherein the second transaction is associated with the user;
 initiating presentation of an interface to the user on the transaction terminal, the interface enabling the user to initiate the second transaction;
 completing execution of the second transaction based on at least determining that the second transaction is within the one or more limits and that the user continues to remain in possession of the wearable device from the first time;
 receiving an indication from the user, through the interface, to initiate a third transaction, wherein the third transaction is not in the pending transaction queue; and
 completing execution of the third transaction based on at least determining that the third transaction is within the one or more limits and that the user continues to remain in possession of the wearable device from the first time.

4. The system of claim 1, wherein the transaction terminal comprises:
 one or more beacon transmitter devices, wherein each of the one or more beacon transmitter devices are structured to transmit a transmitter signal in a predetermined vicinity of the transaction terminal;
 wherein the transmitter signal comprises an encoded unique location code that is structured to be decoded only by the wearable device of the user;
 wherein determining the second user location further comprises determining that the user is within the predetermined vicinity of the transaction terminal based on:
  establishing a communication link between a transmitter of the one or more beacon transmitter devices and the wearable device; and
  receiving, via the communication link, an augmented signal from the wearable device comprising the decoded unique location code and the token associated with the wearable device.

5. The system of claim 1, wherein the module is further configured to:
 determine that the user is no longer in possession of the wearable device based on at least one of (i) determining, via the one or more sensors of the wearable device, that the physiological vital signs of the user are not identifiable, and (ii) determine that the short range wireless communication link between the wearable device and an auxiliary device is no longer present;
 transmit a notification to at least one of the wearable device and the auxiliary device to request user authentication credentials; and
 authenticate the wearable device at a second time based on at least receiving the user authentication credentials.

6. The system of claim 1, wherein the module is further configured to:
 electronically receive the one or more limits associated with execution of the one or more transactions using the wearable device, wherein the one or more limits comprise at least a spending limit, a threshold on a number of transactions, a time limit, a merchant category, a product category, and/or a geographic location.

7. A computer program product for pre-authentication and possession monitoring of a wearable device, wherein the computer program product is configured for authenticating a wearable device for transaction queuing, comprising a non-transitory computer-readable storage medium having computer-executable instructions to:
 receive an indication that a user is in possession of a wearable device, the wearable device being associated with a token, the token being associated with the user;
 authenticate the wearable device at a first time based on at least receiving the indication that the user is in possession of the wearable device, wherein authenticating the wearable device comprises authentication of the token;
 receive an indication that the user wishes to execute a first transaction at a transaction terminal;
 determine a first user location, wherein determining the first user location comprises analyzing at least a user profile of the user;
 determine one or more locations of transaction terminals based on at least a transaction type associated with the first transaction and the first user location;
 receive a selection of at least one location of the one or more locations of transaction terminals from the user through the wearable device, wherein receiving the selection comprises the user initiating the transaction;
 place the first transaction in a pending transaction queue, wherein the pending transaction queue comprises other pending transactions received from the user and/or one or more other users;
 process the first transaction, wherein processing the first transaction comprises at least partial completion of the first transaction;
 transmit a notification to the wearable device indicating that the transaction has been processed, wherein transmitting the notification further comprises:
  determining a second user location that is within a predetermined distance from the transaction terminal, based on communication with the wearable device;
  analyzing a live video stream associated with the transaction terminal to determine a number of other users waiting at the transaction terminal;
  determining a start time associated with the first transaction based on at least the number of other users waiting at the transaction terminal and retrieving scheduled transactions at the transaction terminal;
  determining an end time associated with the first transaction based on at least the transaction type associated with the first transaction and historical durations of the transactions at the transaction terminal; and
  transmitting the notification to the user wearable device comprising at least the approximate start time, the approximate end time and a route map; wherein the route map directs the user to the transaction terminal or a waiting area;

receive the previously authenticated token from the wearable device at the transaction terminal and authenticate the user without requiring additional authorization credentials, wherein the transaction terminal is associated with the received selection of the at least one location;

in response to authenticating the user without requiring additional authentication credentials, complete execution of the first transaction based on at least determining that the first transaction is within one or more limits associated with one or more transactions and that the user continues to remain in possession of the wearable device from the first time, wherein determining that the user continues to remain in possession of the wearable device further comprises at least (i) identifying continuously, via one or more sensors of the wearable device, physiological vital signs of the user comprising at least one of heart rate, blood pressure, gait and physical activity of the user, and (ii) identifying a continuous short range wireless communication link between the wearable device and an auxiliary device from the first time; and transmit a confirmation indicating the completion of the first transaction to the wearable device.

8. The computer program product of claim 7, wherein the non-transitory computer-readable storage medium further having computer-executable instructions to:

establish an operative communication link between the wearable device and the transaction terminal;

electronically receive an indication that the user has scanned the wearable device at the transaction terminal;

retrieve the token associated with the wearable device based on at least receiving the indication that the user has scanned the wearable device at the transaction terminal, wherein the token comprises user identification information; and complete authentication of the user using token information associated with the token.

9. The computer program product of claim 7, wherein completing the transaction further comprises:

determining, automatically, a second transaction from the pending transaction queue, wherein the second transaction is associated with the user;

initiating presentation of an interface to the user on the transaction terminal, the interface enabling the user to initiate the second transaction;

completing execution of the second transaction based on at least determining that the second transaction is within the one or more limits and that the user continues to remain in possession of the wearable device from the first time;

receiving an indication from the user, through the interface, to initiate a third transaction, wherein the third transaction is not in the pending transaction queue; and completing execution of the third transaction based on at least determining that the third transaction is within the one or more limits and that the user continues to remain in possession of the wearable device from the first time.

10. The computer program product of claim 7, wherein the transaction terminal comprises one or more beacon transmitter devices, wherein each of the one or more beacon transmitter devices are structured to transmit a transmitter signal in a predetermined vicinity of the transaction terminal, wherein the transmitter signal comprises an encoded unique location code that is structured to be decoded only by the wearable device of the user, wherein determining the second user location further comprises determining that the user is within the predetermined vicinity of the transaction terminal based on:

establishing a communication link between a transmitter of the one or more beacon transmitter devices and the wearable device; and receiving, via the communication link, an augmented signal from the wearable device comprising the decoded unique location code and the token associated with the wearable device.

11. The computer program product of claim 7, wherein the non-transitory computer-readable storage medium further having computer-executable instructions to:

determine that the user is no longer in possession of the wearable device based on at least one of (i) determining, via the one or more sensors of the wearable device, that the physiological vital signs of the user are not identifiable, and (ii) determine that the short range wireless communication link between the wearable device and an auxiliary device is no longer present;

transmit a notification to at least one of the wearable device and the auxiliary device to request user authentication credentials; and authenticate the wearable device at a second time based on at least receiving the user authentication credentials.

12. The computer program product of claim 7, wherein the non-transitory computer-readable storage medium further having computer-executable instructions to:

electronically receive the one or more limits associated with execution of the one or more transactions using the wearable device, wherein the one or more limits comprise at least a spending limit, a threshold on a number of transactions, a time limit, a merchant category, a product category, and/or a geographic location.

13. A method for pre-authentication and possession monitoring of a wearable device, wherein the method is configured for authenticating a wearable device for transaction queuing, the method comprising:

receiving an indication that a user is in possession of a wearable device, the wearable device being associated with a token, the token being associated with the user;

authenticating the wearable device at a first time based on at least receiving the indication that the user is in possession of the wearable device, wherein authenticating the wearable device comprises authentication of the token;

receiving an indication that the user wishes to execute a first transaction at a transaction terminal;

determining a first user location, wherein determining the first user location comprises analyzing at least a user profile of the user;

determining one or more locations of transaction terminals based on at least a transaction type associated with the first transaction and the first user location;

receiving a selection of at least one location of the one or more locations of transaction terminals from the user through the wearable device, wherein receiving the selection comprises the user initiating the transaction;

placing the first transaction in a pending transaction queue, wherein the pending transaction queue comprises other pending transactions received from the user and/or one or more other users;

processing the first transaction, wherein processing the first transaction comprises at least partial completion of the first transaction;

transmitting a notification to the wearable device indicating that the transaction has been processed, wherein transmitting the notification further comprises:
  determining a second user location that is within a predetermined distance from the transaction terminal, based on communication with the wearable device;
  analyzing a live video stream associated with the transaction terminal to determine a number of other users waiting at the transaction terminal;
  determining a start time associated with the first transaction based on at least the number of other users waiting at the transaction terminal and retrieving scheduled transactions at the transaction terminal;
  determining an end time associated with the first transaction based on at least the transaction type associated with the first transaction and historical durations of the transactions at the transaction terminal; and
  transmitting the notification to the user wearable device comprising at least the approximate start time, the approximate end time and a route map; wherein the route map directs the user to the transaction terminal or a waiting area;
receiving the previously authenticated token from the wearable device at the transaction terminal and authenticate the user without requiring additional authorization credentials, wherein the transaction terminal is associated with the received selection of the at least one location;
in response to authenticating the user without requiring additional authentication credentials, completing execution of the first transaction based on at least determining that the first transaction is within one or more limits associated with one or more transactions and that the user continues to remain in possession of the wearable device from the first time, wherein determining that the user continues to remain in possession of the wearable device further comprises at least (i) identifying continuously, via one or more sensors of the wearable device, physiological vital signs of the user comprising at least one of heart rate, blood pressure, gait and physical activity of the user, and (ii) identifying a continuous short range wireless communication link between the wearable device and an auxiliary device from the first time; and
transmitting a confirmation indicating the completion of the first transaction to the wearable device.

14. The method of claim 13, further comprising:
establishing an operative communication link between the wearable device and the transaction terminal;
electronically receiving an indication that the user has scanned the wearable device at the transaction terminal;
retrieving the token associated with the wearable device based on at least receiving the indication that the user has scanned the wearable device at the transaction terminal, wherein the token comprises user identification information; and
completing authentication of the user using token information associated with the token.

15. The method of claim 13, wherein completing the transaction further comprises:
determining, automatically, a second transaction from the pending transaction queue, wherein the second transaction is associated with the user;
initiating presentation of an interface to the user on the transaction terminal, the interface enabling the user to initiate the second transaction;
completing execution of the second transaction based on at least determining that the second transaction is within the one or more limits and that the user continues to remain in possession of the wearable device from the first time;
receiving an indication from the user, through the interface, to initiate a third transaction, wherein the third transaction is not in the pending transaction queue; and
completing execution of the third transaction based on at least determining that the third transaction is within the one or more limits and that the user continues to remain in possession of the wearable device from the first time.

16. The method of claim 13, wherein the transaction terminal comprises one or more beacon transmitter devices, wherein each of the one or more beacon transmitter devices are structured to transmit a transmitter signal in a predetermined vicinity of the transaction terminal, wherein the transmitter signal comprises an encoded unique location code that is structured to be decoded only by the wearable device of the user, wherein determining the second user location further comprises determining that the user is within the predetermined vicinity of the transaction terminal based on:
establishing a communication link between a transmitter of the one or more beacon transmitter devices and the wearable device; and
receiving, via the communication link, an augmented signal from the wearable device comprising the decoded unique location code and the token associated with the wearable device.

17. The method of claim 13, further comprising:
determining that the user is no longer in possession of the wearable device based on at least one of (i) determining, via the one or more sensors of the wearable device, that the physiological vital signs of the user are not identifiable, and (ii) determine that the short range wireless communication link between the wearable device and an auxiliary device is no longer present;
transmitting a notification to at least one of the wearable device and the auxiliary device to request user authentication credentials; and
authenticating the wearable device at a second time based on at least receiving the user authentication credentials.

18. The system of claim 1, wherein the module is further configured to:
determine that the user continues to remain in possession of the wearable device based on at least (i) continuously monitoring from the first time, via the one or more sensors of the wearable device, the physiological vital signs of the user, and (ii) continuously monitoring from the first time, the short range wireless communication link between the wearable device and the auxiliary device associated with the user.

19. The computer program product of claim 7, wherein the non-transitory computer-readable storage medium further having computer-executable instructions to:
determine that the user continues to remain in possession of the wearable device based on at least (i) continuously monitoring from the first time, via the one or more sensors of the wearable device, the physiological vital signs of the user, and (ii) continuously monitoring from the first time, the short range wireless communication link between the wearable device and the auxiliary device associated with the user.

20. The method of claim 13, further comprising:
determining that the user continues to remain in possession of the wearable device based on at least (i)

continuously monitoring from the first time, via the one or more sensors of the wearable device, the physiological vital signs of the user, and (ii) continuously monitoring from the first time, the short range wireless communication link between the wearable device and the auxiliary device associated with the user.

\* \* \* \* \*